(12) United States Patent
Ho

(10) Patent No.: US 8,581,846 B2
(45) Date of Patent: Nov. 12, 2013

(54) SENSING COMPUTER MOUSE HAVING TOUCH-SENSITIVE MEMBERS DISPOSED ON CURVED BOTTOM SURFACE

(75) Inventor: Chien-Ming Ho, Taipei (TW)

(73) Assignee: Primax Electronics Ltd., Taipei (TW)

( * ) Notice: Subject to any disclaimer, the term of this patent is extended or adjusted under 35 U.S.C. 154(b) by 158 days.

(21) Appl. No.: 13/207,727

(22) Filed: Aug. 11, 2011

(65) Prior Publication Data

US 2012/0319952 A1    Dec. 20, 2012

(30) Foreign Application Priority Data

Jun. 17, 2011    (TW) .............................. 100121156 A

(51) Int. Cl.
*G06F 3/033*    (2013.01)

(52) U.S. Cl.
USPC .......................................... 345/163

(58) Field of Classification Search
USPC ................................. 345/163–167
See application file for complete search history.

(56) References Cited

U.S. PATENT DOCUMENTS

| | | | | |
|---|---|---|---|---|
| 6,130,664 A | * | 10/2000 | Suzuki | 345/158 |
| 6,950,093 B2 | * | 9/2005 | Song | 345/163 |
| 2004/0130531 A1 | * | 7/2004 | Cheng | 345/163 |

* cited by examiner

*Primary Examiner* — Chang Nguyen
*Assistant Examiner* — James Nokham
(74) *Attorney, Agent, or Firm* — Kirton McConkie; Evan R. Witt

(57) ABSTRACT

A sensing mouse includes a base, an upper cover, a plurality of touch-sensitive members and a controlling unit. The base has a curvy surface. The base is sheltered by the upper cover. The touch-sensitive members are disposed on the curvy surface and in communication with the controlling unit. When one of the touch-sensitive members is contacted with a working surface, a moving direction of the cursor is determined by the controlling unit according to a touching signal from the pressed touch-sensitive member, and a displacement amount of the cursor is determined by the controlling unit according to a contact area between the pressed touch-sensitive member and the working surface.

10 Claims, 6 Drawing Sheets

# SENSING COMPUTER MOUSE HAVING TOUCH-SENSITIVE MEMBERS DISPOSED ON CURVED BOTTOM SURFACE

FIELD OF THE INVENTION

The present invention relates to a mouse, and more particularly to a sensing mouse.

BACKGROUND OF THE INVENTION

The common input device of a computer system includes for example a mouse, a keyboard, a trackball or a touchpad. Among these input devices, the mouse is the most prevailing because it is very easy-to-use. When a mouse is held by the palm of a user's hand, the user may move the mouse to control movement of the cursor shown on the computer monitor.

FIG. 1 is a schematic view illustrating the connection between a conventional mouse and a computer system. As shown in FIG. 1, the computer system 2 comprises a computer host 21 and a computer monitor 22. The computer host 21 is in communication with a wheel mouse 1 and the computer monitor 22. The computer host 21 has a connecting port 211. The connecting port 211 is connected with the wheel mouse 1. A graphic-based window 221 and a cursor 222 are displayed on the computer monitor 22. The wheel mouse 1 is used for controlling the cursor 222 to have the computer host 21 execute a corresponding command. The wheel mouse 1 comprises a casing 10, a left button 11, a right button 12 and a scroll wheel 13. The casing 10 is used for supporting a user's palm P. When the casing 10 is moved by the user to result in a displacement amount, the cursor 222 shown on the computer monitor 22 is correspondingly moved by the computer host 21 according to the displacement amount. By clicking the left button 11 or the right button 12, a control signal is issued to the computer host 21. In response to the control signal, the computer host 21 executes a corresponding command. The scroll wheel 13 is arranged between the left button 11 and the right button 12. By rotating the scroll wheel 13, a scrolling signal is generated. In response to the scrolling signal, the computer host 21 executes a function of scrolling the graphic-based window 221.

FIG. 2 schematically illustrates a conventional wheel mouse to be manipulated by a user. For operating the wheel mouse 1, the user's palm P should be supported on the casing 10 while a first finger F1 is placed on the left button 11 and a second finger F2 is placed on the right button 12. In such way, the user may start to manipulate the wheel mouse 1. Moreover, during operations of the mouse 1, the mouse 1 should be placed on a flat working surface. Consequently, the cursor 222 shown on the computer monitor 22 is correspondingly moved according to the displacement amount of moving the mouse 1.

The conventional mouse 1, however, still has some drawbacks. For example, the mouse 1 should be handheld in the hand gesture as shown in FIG. 2, and the mouse 1 should be placed on a flat working surface during operations. This hand gesture makes the user's wrist in a floating state. If the mouse 1 has been used for a long term, the user may readily feel tired or uncomfortable because of wrist fatigue or wrist muscle injury. Moreover, if the working surface is uneven or the texture of the working surface is not obvious, the cursor 222 fails to be smoothly moved as the movement of the mouse 1. Therefore, there is a need of providing an improved mouse for reducing the fatigue of the user's wrist without the need of being moved on the flat working surface.

SUMMARY OF THE INVENTION

The present invention provides a sensing mouse for reducing the fatigue of the user's wrist during the process of operating the sensing mouse.

The present invention also provides a sensing mouse capable of being moved on an uneven surface.

In accordance with an aspect of the present invention, there is provided a sensing mouse. The sensing mouse is in communication with a computer system for controlling movement of cursor of the computer system. The sensing mouse includes a base, an upper cover, a plurality of touch-sensitive members and a controlling unit. The base has a curvy surface to be contacted with a working surface, wherein the curvy surface has a bottom part. The base is sheltered by the upper cover. The touch-sensitive members are disposed on the curvy surface and arranged around the bottom part. When one of the touch-sensitive members is pressed by the working surface, a corresponding touching signal is generated. The controlling unit is disposed within the base and in communication with the touch-sensitive members. According to the touching signal from the pressed touch-sensitive member, a moving direction and a displacement amount of the cursor are determined by the controlling unit.

In an embodiment, each of the touch-sensitive members includes a conductor, a sensing element and an elastic element. The conductor is disposed within the base. The sensing element is stacked on the conductor. When the sensing element is pressed by the working surface and the sensing element is contacted with the conductor, a capacitance effect is generated and the corresponding touching signal is outputted. The elastic element is disposed between the conductor and the sensing element for providing an elastic force to the sensing element. In response to the elastic force, the sensing element is separated from the conductor.

In an embodiment, the displacement amount of the cursor is determined by the controlling unit according to a magnitude of the capacitance effect resulting from a contact area between the conductor and the sensing element.

In an embodiment, the sensing element is a flat flexible circuit board with a copper foil covering. A plurality of copper foil contacts are formed on the flat flexible circuit board. According to a number of copper foil contacts in contact with the conductor, the contact area between the conductor and the sensing element is determined by the controlling unit.

In an embodiment, the controlling unit has a preset idle time. After the bottom part of the curvy surface is in contact with the working surface and none of the touch-sensitive members has been pressed for a time period longer than the preset idle time, the sensing mouse is operated in a sleep mode.

In an embodiment, the sensing mouse further includes a switching key, which is disposed on the upper cover and in communication with the controlling unit. When the switching key is pressed, a switching signal is transmitted to the controlling unit. In response to a switching signal, the controlling unit switches an operating mode of the sensing mouse from a cursor control mode to a scroll bar control mode or from the scroll bar control mode to the cursor control mode.

In an embodiment, when the sensing mouse is operated in the cursor control mode, the moving direction of the cursor is determined by the controlling unit according to the touching signal from the pressed touch-sensitive member, and the displacement amount of the cursor is determined by the control-` ling unit according to a contact area between the pressed touch-sensitive member and the working surface, wherein when the sensing mouse is operated in the scroll bar control mode, a scrolling direction of a scroll bar of the computer system is determined by the controlling unit according to the touching signal from the pressed touch-sensitive member, and a displacement amount of the scroll bar is determined by the controlling unit according to the contact area between the pressed touch-sensitive member and the working surface.

In an embodiment, the sensing mouse further includes a wireless signal transmitter and a wireless signal receiver. The wireless signal transmitter is disposed within the base for generating a cursor moving signal including the moving direction and the displacement amount of the cursor or generating a scroll bar moving signal including the scrolling direction and the displacement amount of the scroll bar. The wireless signal receiver is connected to the computer system for receiving the cursor moving signal and the scroll bar moving signal. The cursor is moved by the computer system according to the cursor moving signal. In addition, the scroll bar is scrolled by the computer system according to the scroll bar moving signal.

In an embodiment, the sensing mouse further includes a scroll sensor, which is disposed on the upper cover and in communication with the controlling unit for detecting movement of a user's finger on the scroll sensor, thereby generating a scrolling signal. According to the scrolling signal, a scrolling direction and a displacement amount of a scroll bar of the computer system are determined by the controlling unit.

In an embodiment, the upper cover includes a first button and a second button. The first button is disposed on the upper cover. When the first button is pressed, a first button signal is generated. The second button is disposed on the upper cover and arranged beside the first button. When the second button is pressed, a second button signal is generated. In addition, the upper cover has a flat surface.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
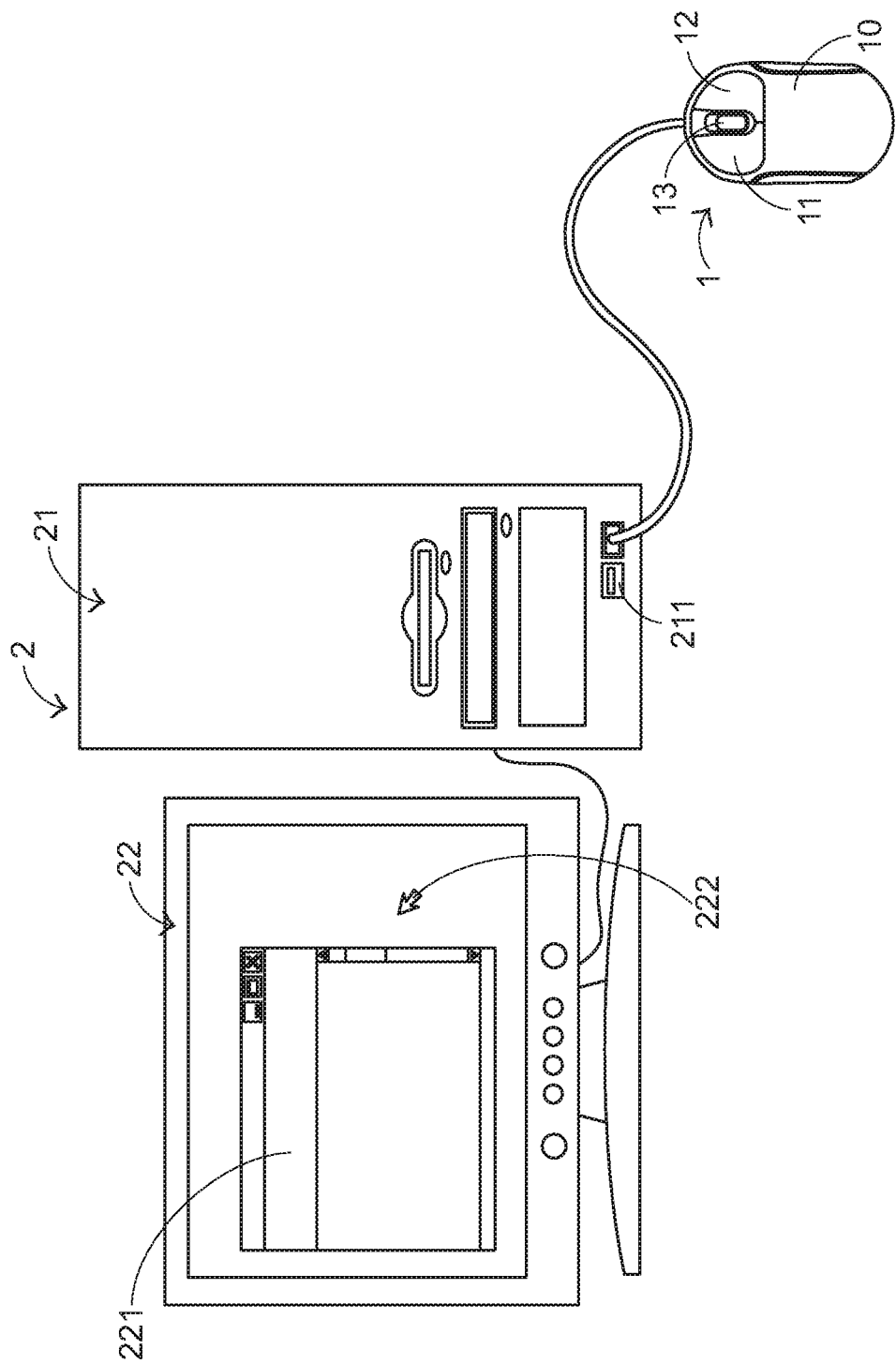
FIG. 1 is a schematic view illustrating the connection between a conventional mouse and a computer system.
Figure 2:
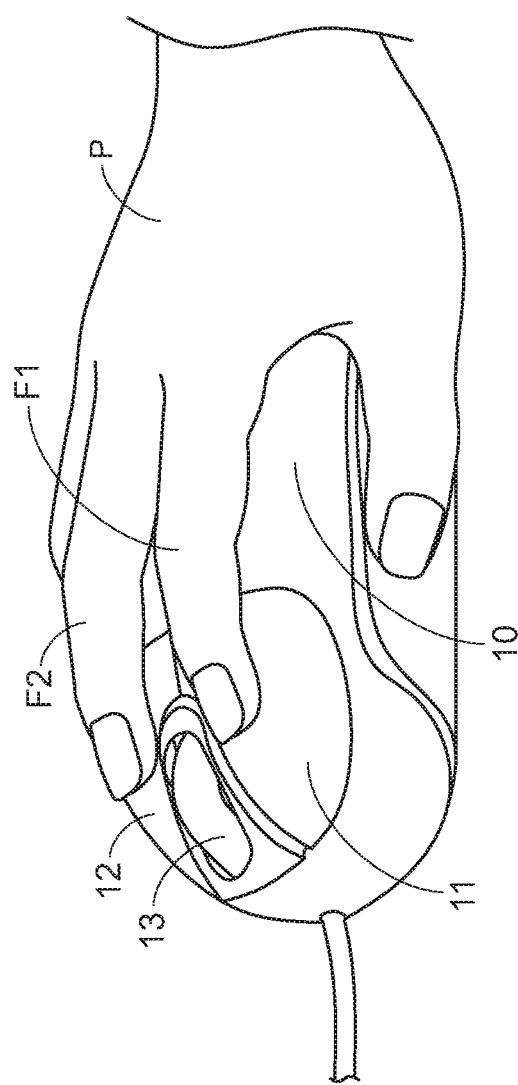
FIG. 2 schematically illustrates a conventional wheel mouse to be manipulated by a user.
Figure 3:
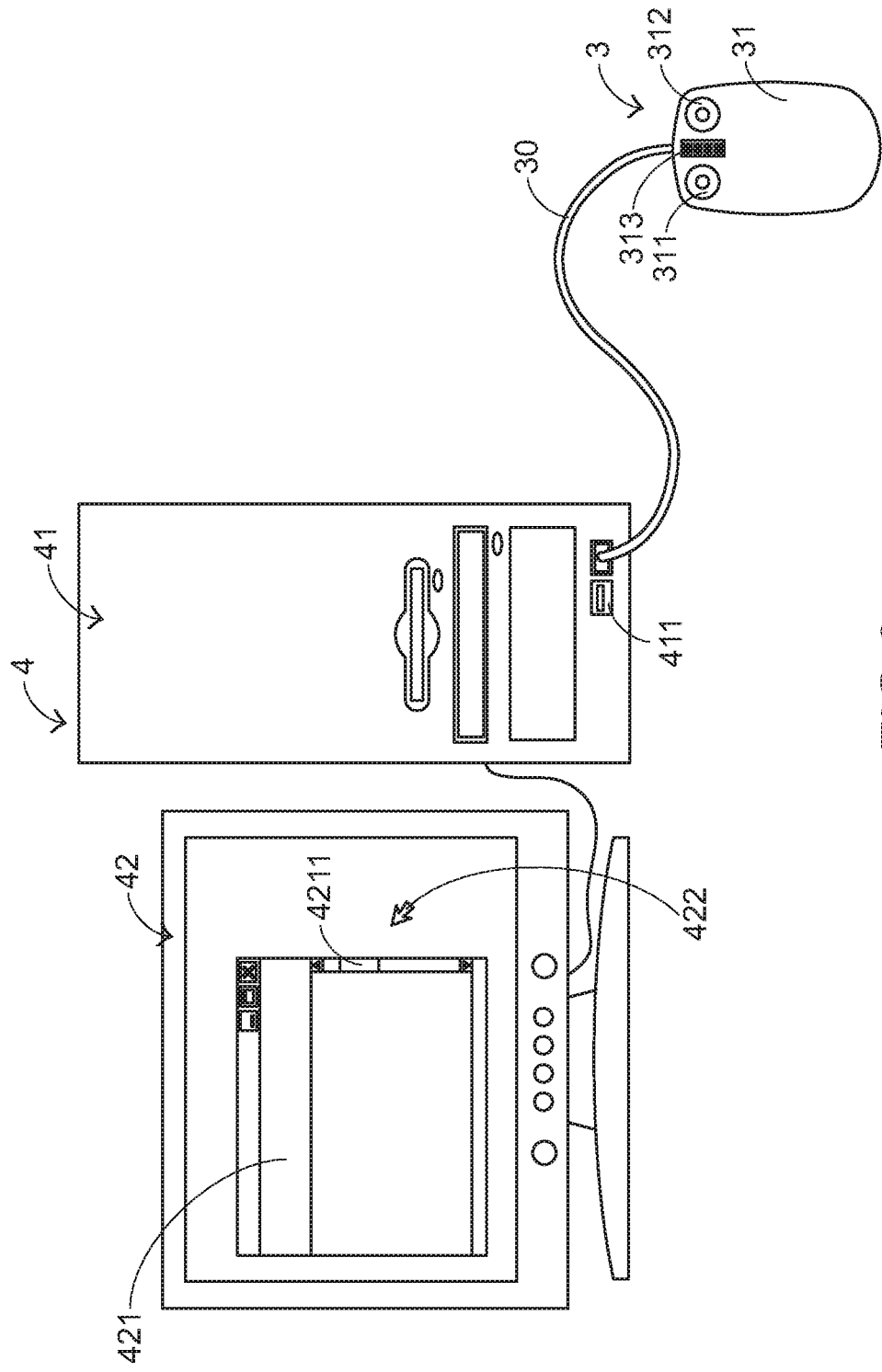
FIG. 3 is a schematic view illustrating the connection between a sensing mouse and a computer system according to a first embodiment of the present invention.

For obviating the drawbacks encountered from the prior art, the present invention provides a sensing mouse. FIG. 3 is a schematic view illustrating the connection between a sensing mouse and a computer system according to a first embodiment of the present invention. As shown in FIG. 3, the computer system 4 comprises a computer host 41 and a computer monitor 42. The computer host 41 has a connecting port 411. In this embodiment, the connecting port 411 is a universal serial bus (USB) socket. The computer monitor 42 is connected with the computer host 41 for displaying a graphic-based window 421 and a cursor 422. A scroll bar 4211 is shown on the graphic-based window 421. A sensing mouse 3 is connected to the connecting port 411 of the computer host 41 through a connecting wire 30 for controlling movement of the cursor 422.

Please refer to FIG. 3 again. A first button 311, a second button 312 and a scroll sensor 313 are disposed on an upper cover 31 of the sensing mouse 3. The first button 311 is disposed on the upper cover 31. When the first button 311 is pressed, a first button signal is generated. The second button 312 is disposed on the upper cover 31 and arranged beside the first button 311. When the second button 312 is pressed, a second button signal is generated. The scroll sensor 313 is disposed on the upper cover 31 and located at a side the upper cover 31. The scroll sensor 313 is used for detecting movement of a user's finger on the scroll sensor 313, thereby generating a scrolling signal. In this embodiment, the first button 311 is a left button, and the second button 312 is a right button.

Figure 4:
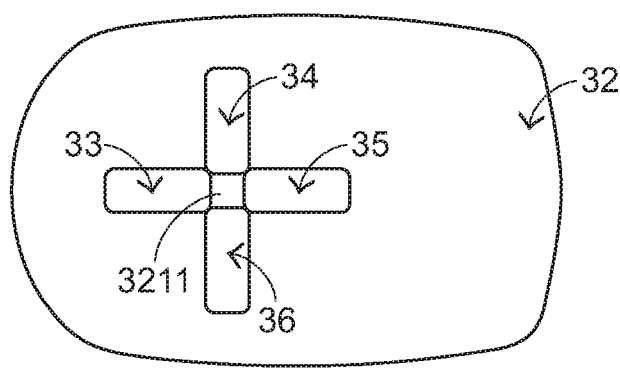
FIG. 4 is a schematic bottom view illustrating the sensing mouse according to the first embodiment of the present invention.
Figure 5:
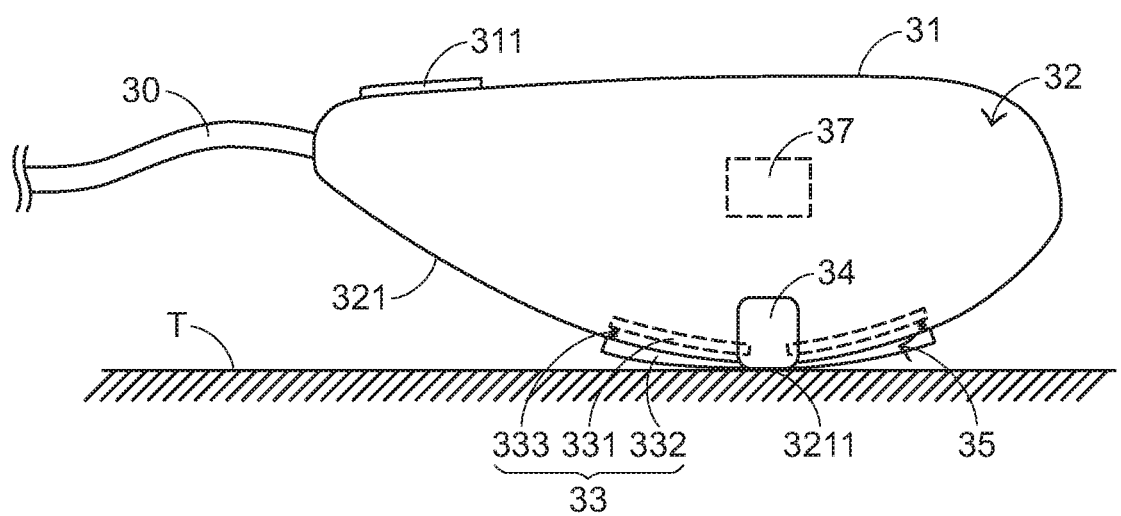
FIG. 5 is a schematic side view illustrating the sensing mouse according to the first embodiment of the present invention.

Hereinafter, the configurations of the sensing mouse will be illustrated with reference to FIGS. 4 and 5. FIG. 4 is a schematic bottom view illustrating the sensing mouse according to the first embodiment of the present invention. FIG. 5 is a schematic side view illustrating the sensing mouse according to the first embodiment of the present invention. In addition to the upper cover 31, the sensing mouse 3 further comprises a base 32, a first touch-sensitive member 33, a second touch-sensitive member 34, a third touch-sensitive member 35, a fourth touch-sensitive member 36 and a controlling unit 37. The base 32 has a curvy surface 321. The curvy surface 321 may be contacted with a working surface T. The curvy surface 321 has a bottom part 3211. The base 32 is covered by the upper cover 31. In addition, the upper cover 31 has a flat surface. The first touch-sensitive member 33 is disposed on the curvy surface 321 and located at a first side of the bottom part 3211. When the first touch-sensitive member 33 is pressed by the working surface T, the touch-sensitive member 33 generates a first touching signal. Similarly, the second touch-sensitive member 34 is disposed on the curvy surface 321 and located at a second side of the bottom part 3211. When the second touch-sensitive member 34 is pressed by the working surface T, the second touch-sensitive member 34 generates a second touching signal. The third touch-sensitive member 35 is disposed on the curvy surface 321 and located at a third side of the bottom part 3211. When the third touch-sensitive member 35 is pressed by the working surface T, the third touch-sensitive member 35 generates a third touching signal. The fourth touch-sensitive member 36 is disposed on the curvy surface 321 and located at a fourth side of the bottom part 3211. When the fourth touch-sensitive member 36 is pressed by the working surface T, the fourth touch-sensitive member 36 generates a fourth touching signal. That is, the bottom part 3211 is surrounded by the first touch-sensitive member 33, the second touch-sensitive member 34, the third touch-sensitive member 35 and the fourth touch-sensitive member 36 (see FIG. 4).

As shown in FIG. 5, the controlling unit 37 is disposed within the base 32. In addition, the controlling unit 37 is in communication with the first touch-sensitive member 33, the second touch-sensitive member 34, the third touch-sensitive member 35, the fourth touch-sensitive member 36 and the scroll sensor 313. According to a touching signal issued from one of the touch-sensitive members 33~36, the controlling unit 37 may determine the moving direction and the displacement amount of the cursor 422. Moreover, according to the scrolling signal issued from the scroll sensor 313, the controlling unit 37 may determine the moving direction and the displacement amount of the scroll bar 4211 shown on the graphic-based window 421 of the computer system 4. For example, in response to a first touching signal from the first touch-sensitive member 33, the cursor 422 shown on the computer monitor 42 is controlled by the controlling unit 37 to be moved upwardly. In response to a second touching signal from the second touch-sensitive member 34, the cursor 422 shown on the computer monitor 42 is controlled by the controlling unit 37 to be moved toward the left side. In response to a second touching signal from the third touch-sensitive member 35, the cursor 422 shown on the computer monitor 42 is controlled by the controlling unit 37 to be moved downwardly. In response to a second touching signal from the fourth touch-sensitive member 36, the cursor 422 shown on the computer monitor 42 is controlled by the controlling unit 37 to be moved toward the right side.

The configurations of the first touch-sensitive member 33, the second touch-sensitive member 34, the third touch-sensitive member 35 and the fourth touch-sensitive member 36 are identical to each other. For clarification and brevity, only the first touch-sensitive member 33 will be illustrated as follows. The operating principles of other touch-sensitive members 34~36 are similar to those of the first touch-sensitive member 33, and are not redundantly described herein. Please refer to FIG. 5 again. The first touch-sensitive member 33 comprises a first conductor 331, a first sensing element 332 and a first elastic element 333. The first conductor 331 is disposed within the base 32. The first sensing element 332 is stacked on the first conductor 331. When the first sensing element 332 is pressed by the working surface T, the first sensing element 332 is contacted with the first conductor 331. Consequently, a capacitance effect between the first conductor 331 and the first sensing element 332 is generated and a corresponding touching signal is outputted. The first elastic element 333 is arranged between the first conductor 331 and the first sensing element 332 for providing an elastic force to the first sensing element 332. In response to the elastic force, the first sensing element 332 is separated from the first conductor 331. The controlling unit 37 is in communication with the first touch-sensitive member 33. According to the magnitude of the capacitance effect resulting from a contact area between the first conductor 331 and the first sensing element 332, the controlling unit 37 may determine the displacement amount of the cursor. In an embodiment, the first sensing element 332 is a flat flexible circuit (FPC) board (not shown) with a copper foil covering (not shown). Moreover, a plurality of copper foil contacts (not shown) are formed on the flat flexible circuit board. A weak capacitance value is generated between these copper foil contacts. In other words, the controlling unit 37 can determine the moving direction of the cursor 422 according to the triggered touch-sensitive member, and determine the displacement amount of the cursor 422 according to the contact area between the conductor and the sensing element of the triggered touch-sensitive member.

For operating the sensing mouse 3, the user's palm (not show) should be supported on the flat surface of the upper cover 31 while holding the sensing mouse 3. In addition, the bottom part 3211 of the curvy surface 321 of the base 32 is in contact with the working surface T; but the first touch-sensitive member 33, the second touch-sensitive member 34, the third touch-sensitive member 35 and the fourth touch-sensitive member 36 located around the bottom part 3211 are not in contact with the working surface T. Under this circumstance, the sensing mouse is operated in a sleep mode. In a case that the user wants to move the cursor 422 toward the top side of computer screen 42, the sensing mouse 3 may be tilted toward the front end thereof. Meanwhile, the contact area between the curvy surface 321 and the working surface T is switched from the bottom part 3211 to the first touch-sensitive member 33. Consequently, the first touch-sensitive member 33 is pressed by the working surface T, the first elastic element 333 is compressed by the first sensing element 332, and a capacitance effect between the first conductor 331 and the first sensing element 332 is generated. Meanwhile, the capacitance value between the copper foil contacts on the flat flexible circuit board is changed. As the capacitance effect is increased, the capacitance value is increased. Moreover, the capacitance value is substantially in direct proportion to the number of copper foil contacts that are in contact with the first conductor 331. The controlling unit 37 is in communication with the first touch-sensitive member 33. According to the magnitude of the capacitance effect, the controlling unit 37 may determine the displacement amount of the cursor 422 and the cursor moving signal including the displacement amount may be transmitted to the computer host 41 through the connecting wire 30. In response to the cursor moving signal, the cursor 422 shown on the computer monitor 42 is correspondingly moved. The actions of moving the cursors 422 in other directions are similar to the action of moving the cursor 422 upwardly, and are not redundantly described herein.

In addition, the controlling unit 37 has a preset idle time. After the bottom part 3211 of the curvy surface 321 is in contact with the working surface T and none of the touch-sensitive members has been pressed for a time period longer than the preset idle time, the controlling unit 37 will control the sensing mouse 3 to be operated in the sleep mode. Under this circumstance, the power-saving purpose is achieved.

Figure 6:
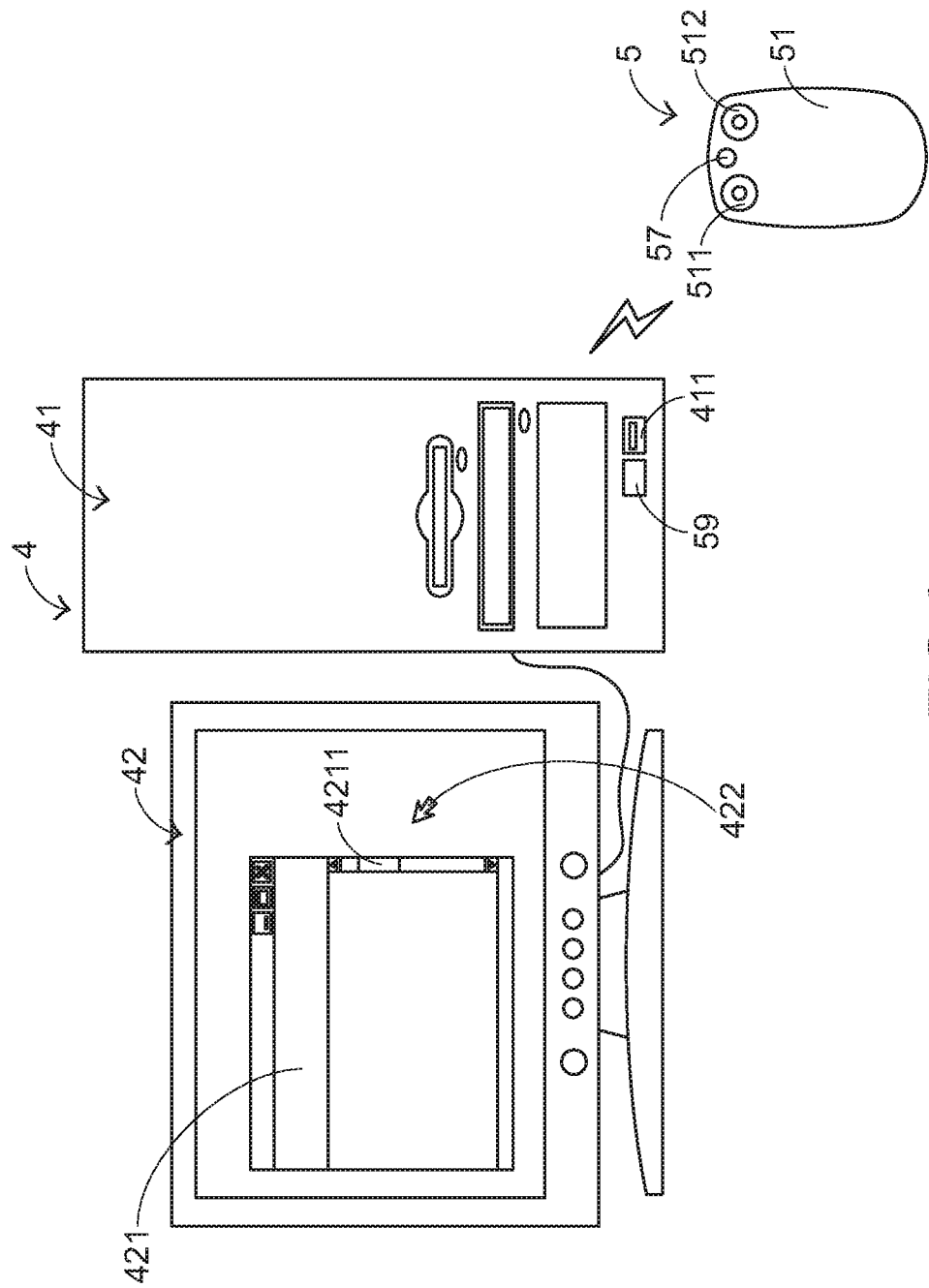
FIG. 6 is a schematic view illustrating the connection between a sensing mouse and a computer system according to a second embodiment of the present invention.
Figure 7:
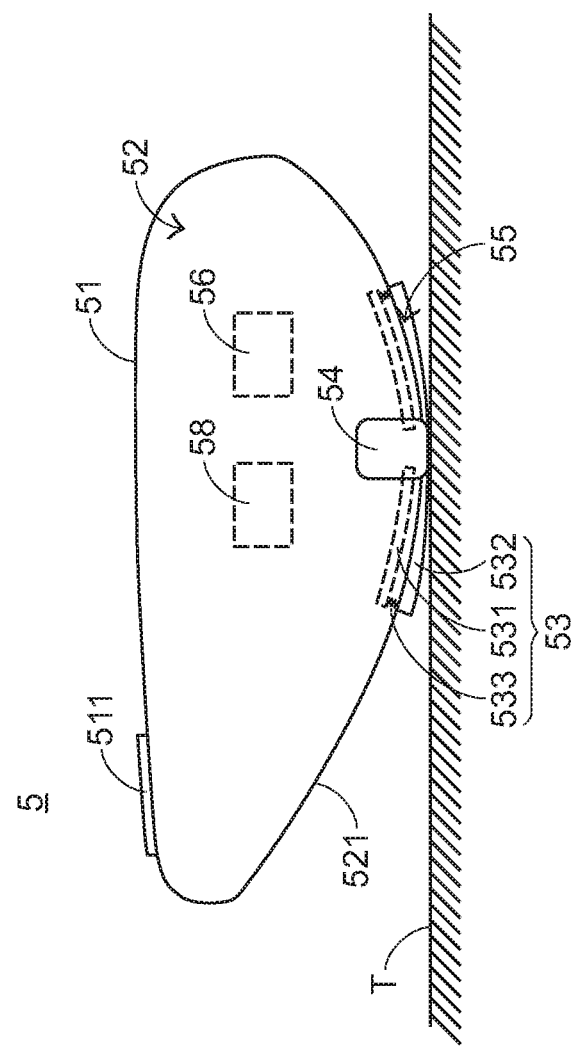
FIG. 7 is a schematic side view illustrating the sensing mouse according to the second embodiment of the present invention.

Hereinafter, a second embodiment of a sensing mouse will be illustrated with reference to FIGS. 6 and 7. FIG. 6 is a schematic view illustrating the connection between a sensing mouse and a computer system according to a second embodiment of the present invention. FIG. 7 is a schematic side view illustrating the sensing mouse according to the second embodiment of the present invention. The sensing mouse 5 comprises an upper cover 51, a base 52, a first touch-sensitive member 53, a second touch-sensitive member 54, a third touch-sensitive member 55, a fourth touch-sensitive member (not shown), a controlling unit 56, a switching key 57, a wireless signal transmitter 58 and a wireless signal receiver 59. A first button 511 and a second button 512 are disposed on the upper cover 51. The first touch-sensitive member 53 comprises a first conductor 531, a first sensing element 532 and a first elastic element 533. The configurations of the upper cover 51, the base 52, the first touch-sensitive member 53, the second touch-sensitive member 54, the third touch-sensitive member 55 and the fourth touch-sensitive member of this embodiment are similar to those of the first embodiment, and are not redundantly described herein. The second embodiment is distinguished from the first embodiment because of the following two features.

Firstly, the wireless signal transmitter 58 of the sensing mouse 5 is disposed within the base 52 for issuing a cursor moving signal and a scroll bar moving signal. The cursor moving signal includes a moving direction and a displacement amount of the cursor 422. The scroll bar moving signal includes a scrolling direction and a displacement amount of the scroll bar 4211. As shown in FIG. 6, the wireless signal receiver 59 is plugged into the connecting port 411 of the computer host 41 for receiving the cursor moving signal and the scroll bar moving signal from the wireless signal transmitter 58.

Secondly, no scroll sensor is disposed on the sensing mouse 5. The scrolling action of the scroll bar 4211 is controlled by operating the first touch-sensitive member 53 and the third touch-sensitive member 55. The scrolling action of the scroll bar 4211 is similar to the action of moving the cursor 422. In this embodiment, through a switching key 57 on the upper cover 51 of the sensing mouse 5, the action of controlling movement of the cursor 422 and the action of scrolling the scroll bar 4211 by triggering the first touch-sensitive member 53, the second touch-sensitive member 54, the third touch-sensitive member 55 or the fourth touch-sensitive member may be switched. The switching key 57 is in communication with the controlling unit 56. By pressing the switching key 57, a switching signal is transmitted to the controlling unit 56. In response to the switching signal, the controlling unit 56 will switch the operating mode of the sensing mouse 5 from a cursor control mode to a scroll bar control mode, or switch the operating mode of the sensing mouse 5 from the scroll bar control mode to the cursor control mode. In a case that the sensing mouse 5 is operated in the cursor control mode, the first touch-sensitive member 53, the second touch-sensitive member 54, the third touch-sensitive member 55 and the fourth touch-sensitive member may be triggered to control movement of the cursor 422. Whereas, in a case that the sensing mouse 5 is operated in the scroll bar control mode, the first touch-sensitive member 53 and the third touch-sensitive member 55 are triggered to control movement of the scroll bar 4211.

From the above two embodiments, it is found that the sensing mouse of the present invention has many benefits. For example, the base of the sensing mouse has a curvy surface with touch-sensitive members. By contacting one of the touch-sensitive members with the working surface, the cursor shown on the computer monitor is correspondingly moved. Consequently, even if the working surface is not flat, the sensing mouse can be normally operated. Moreover, due to the curvy surface of the base of the sensing mouse, the touch-sensitive member can be triggered to control movement of the cursor by slightly tilting the sensing mouse. In other words, the way of operating the sensing mouse of the present invention is distinguished from the way of operating the conventional mouse. According to the specially-designed structure of the sensing mouse of the present invention, the fatigue of the user's wrist arising from the operation of the sensing mouse will be largely reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sensing mouse in communication with a computer system for controlling movement of a cursor of said computer system, said sensing mouse comprising:
   a base having a curvy surface to be contacted with a working surface, wherein said curvy surface has a bottom part;
   an upper cover for sheltering said base;
   a plurality of touch-sensitive members disposed on said curvy surface and arranged around said bottom part, wherein when one of said touch-sensitive members is pressed by said working surface, a corresponding touching signal is generated; and
   a controlling unit disposed within said base and in communication with said touch-sensitive members, wherein a moving direction and a displacement amount of said cursor are determined by said controlling unit according to said touching signal from said pressed touch-sensitive member.

2. The sensing mouse according to claim 1 wherein each of said touch-sensitive members comprises:
   a conductor disposed within said base;
   a sensing element stacked on said conductor, wherein when said sensing element is pressed by said working surface and said sensing element is contacted with said conductor, a capacitance effect is generated and said corresponding touching signal is outputted; and
   an elastic element disposed between said conductor and said sensing element for providing an elastic force to said sensing element, wherein in response to said elastic force, said sensing element is separated from said conductor.

3. The sensing mouse according to claim 2 wherein said displacement amount of said cursor is determined by said controlling unit according to a magnitude of said capacitance effect resulting from a contact area between said conductor and said sensing element.

4. The sensing mouse according to claim 3 wherein said sensing element is a flat flexible circuit board with a copper foil covering, and a plurality of copper foil contacts are formed on said flat flexible circuit board, wherein according to a number of copper foil contacts in contact with said conductor, said contact area between said conductor and said sensing element is determined by said controlling unit.

5. The sensing mouse according to claim 1 wherein said controlling unit has a preset idle time, wherein after said bottom part of said curvy surface is in contact with said working surface and none of said touch-sensitive members has been pressed for a time period longer than said preset idle time, said sensing mouse is operated in a sleep mode.

6. The sensing mouse according to claim 1 further comprising a switching key, which is disposed on said upper cover and in communication with said controlling unit, wherein when said switching key is pressed, a switching signal is transmitted to said controlling unit, wherein in response to a switching signal, said controlling unit switches an operating mode of said sensing mouse from a cursor control mode to a scroll bar control mode or from said scroll bar control mode to said cursor control mode.

7. The sensing mouse according to claim 6 wherein when said sensing mouse is operated in said cursor control mode, said moving direction of said cursor is determined by said controlling unit according to said touching signal from said pressed touch-sensitive member, and said displacement amount of said cursor is determined by said controlling unit according to a contact area between said pressed touch-sensitive member and said working surface, wherein when said sensing mouse is operated in said scroll bar control mode, a scrolling direction of a scroll bar of said computer system is determined by said controlling unit according to said touching signal from said pressed touch-sensitive member, and a displacement amount of said scroll bar is determined by said controlling unit according to said contact area between said pressed touch-sensitive member and said working surface.

8. The sensing mouse according to claim 7 further comprising:
- a wireless signal transmitter disposed within said base for generating a cursor moving signal including said moving direction and said displacement amount of said cursor or generating a scroll bar moving signal including said scrolling direction and said displacement amount of said scroll bar; and
- a wireless signal receiver connected to said computer system for receiving said cursor moving signal and said scroll bar moving signal, wherein said cursor is moved by said computer system according to said cursor moving signal, and said scroll bar is scrolled by said computer system according to said scroll bar moving signal.

9. The sensing mouse according to claim 1 further comprising a scroll sensor, which is disposed on said upper cover and in communication with said controlling unit for detecting movement of a user's finger on said scroll sensor, thereby generating a scrolling signal, wherein a scrolling direction and a displacement amount of a scroll bar of said computer system are determined by said controlling unit according to said scrolling signal.

10. The sensing mouse according to claim 1 wherein said upper cover comprises:
- a first button disposed on said upper cover, wherein when said first button is pressed, a first button signal is generated; and
- a second button disposed on said upper cover and arranged beside said first button, wherein when said second button is pressed, a second button signal is generated, wherein said upper cover has a flat surface.

* * * * *